(12) United States Patent
Tsuji

(10) Patent No.: US 10,509,550 B2
(45) Date of Patent: Dec. 17, 2019

(54) DISPLAY DEVICE CHANGING DISPLAYED IMAGE IN ACCORDANCE WITH DEPRESSED STATE ON TOUCH PANEL AND IMAGE PROCESSING DEVICE USING SAME

(71) Applicant: KYOCERA Document Solutions Inc., Osaka-shi, Osaka (JP)

(72) Inventor: Takuya Tsuji, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 409 days.

(21) Appl. No.: 15/221,826

(22) Filed: Jul. 28, 2016

(65) Prior Publication Data

US 2017/0031570 A1  Feb. 2, 2017

(30) Foreign Application Priority Data

Jul. 30, 2015 (JP) ................. 2015-150539

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0416* (2013.01); *G06F 3/0488* (2013.01);
(Continued)

(58) Field of Classification Search
CPC ............... G06F 3/0488; G06F 3/04845; G06F 3/04847; G06F 3/0484; G06F 2203/04808;
(Continued)

(56) References Cited

U.S. PATENT DOCUMENTS

2007/0024736 A1  2/2007  Matsuda et al.
2009/0207142 A1*  8/2009  Keranen ............. G06F 3/04845
                                                                345/173
(Continued)

FOREIGN PATENT DOCUMENTS

CN  101981536 A  2/2011
EP  2405335 A2  1/2012
(Continued)

OTHER PUBLICATIONS

Office Action issued in the counterpart Chinese Patent Application No. 201610601769.8 dated Nov. 28, 2018, 5 pages (Reference Purpose Only).
(Continued)

*Primary Examiner* — Phuong H Nguyen
(74) *Attorney, Agent, or Firm* — Viering, Jentschura & Partner MBB

(57) ABSTRACT

A display device includes a touch panel, a depressed time measuring section, a determining section, a virtual line displaying section, a display mode changing section, and a virtual line hiding section. The depressed time measuring section measures depressed time on the touch panel. The determining section determines whether the depressed time measured by the depressed time measuring section is longer than a prescribed period of time. The virtual line displaying section displays a virtual line extending in the diagonal direction of the rectangular image if the determining section determines that the depressed time is longer than the prescribed period of time. The display mode changing section changes display modes of the image depending on the depressed state of the virtual line displayed by the virtual line displaying section. The virtual line hiding section hides the display of the displayed virtual line.

7 Claims, 11 Drawing Sheets

(51) Int. Cl.
*H04N 1/00* (2006.01)
*G06F 3/041* (2006.01)
*G06F 3/0488* (2013.01)

(52) U.S. Cl.
CPC ..... *H04N 1/00411* (2013.01); *H04N 1/00456* (2013.01); *H04N 1/00469* (2013.01); *H04N 2201/0094* (2013.01)

(58) Field of Classification Search
CPC .. G06F 3/041; G06F 2203/04806; G06F 3/01; G06F 3/017; G06F 3/0416; G06F 3/016; G06F 3/04812
See application file for complete search history.

(56) References Cited

U.S. PATENT DOCUMENTS

| | | |
|---|---|---|
| 2009/0237712 A1 | 9/2009 | Shirai |
| 2011/0181527 A1 | 7/2011 | Capela et al. |
| 2011/0181528 A1* | 7/2011 | Capela ................ G06F 3/04845 345/173 |
| 2013/0033717 A1* | 2/2013 | Matsumoto ........... G06F 3/0483 358/1.13 |
| 2013/0314724 A1 | 11/2013 | Tamura et al. |
| 2014/0108933 A1* | 4/2014 | Lee .................... G06F 3/04883 715/722 |

FOREIGN PATENT DOCUMENTS

| | | |
|---|---|---|
| JP | 2006085245 A | 3/2006 |
| JP | 2012090785 A | 5/2012 |

OTHER PUBLICATIONS

European Search Report issued in the counterpart European Patent Application No. 16 180 966.0, dated Dec. 8, 2016.

* cited by examiner

DISPLAY DEVICE CHANGING DISPLAYED IMAGE IN ACCORDANCE WITH DEPRESSED STATE ON TOUCH PANEL AND IMAGE PROCESSING DEVICE USING SAME

INCORPORATION BY REFERENCE

The disclosure of Japanese patent application No. 2015-150539 filed on Jul. 30, 2015, including specification, drawings and abstract thereof is herein incorporated by reference in its entirety.

BACKGROUND

1. Field of Invention

This disclosure relates to a display device and an image processing device.

2. Background Art

In image forming devices represented by multifunction peripherals and the like, an image of a manuscript is read by an image reader section, and a photo conductor, which is disposed in an image forming section, is irradiated with light to form an electrostatic latent image on the photo conductor on the basis of the data of the image read by the image reader section. Then, a charged developer such as a toner is supplied on the formed electrostatic latent image to visualize the image, the visualized image is transferred and fixed onto a sheet of paper, and the sheet of paper is discharged out of the device.

Some image processing devices are provided with a touch panel as a display device displaying an image of read image data and thumbnail image data. A user inputs conditions for image formation, reviews an image to be output on a sheet of paper, and the like through the touch panel. Here, some techniques involving magnifying an image based on image data, which is displayed on a screen, have been already disclosed.

SUMMARY

In an aspect of the present disclosure, a display device that displays an image based on image data is disclosed. The display device includes a touch panel, a depressed time measuring section, a determining section, a virtual line displaying section, a display mode changing section, and a virtual line hiding section. The touch panel transforms image data into a rectangular image and displays the rectangular image on a screen. The depressed time measuring section measures depressed time on the touch panel. The determining section determines whether the depressed time measured by the depressed time measuring section is longer than a prescribed period of time. The virtual line displaying section displays a virtual line extending in the diagonal direction of the rectangular image if the determining section determines that the depressed time is longer than the prescribed period of time. The display mode changing section changes display modes of the image that has been displayed on the touch panel depending on the depressed state of the virtual line displayed by the virtual line displaying section. The virtual line hiding section hides the display of the displayed virtual line.

In another aspect of this disclosure, the image processing device comprises an image processing section that processes image data and the display device as described above.

DETAILED DESCRIPTION

Figure 1:
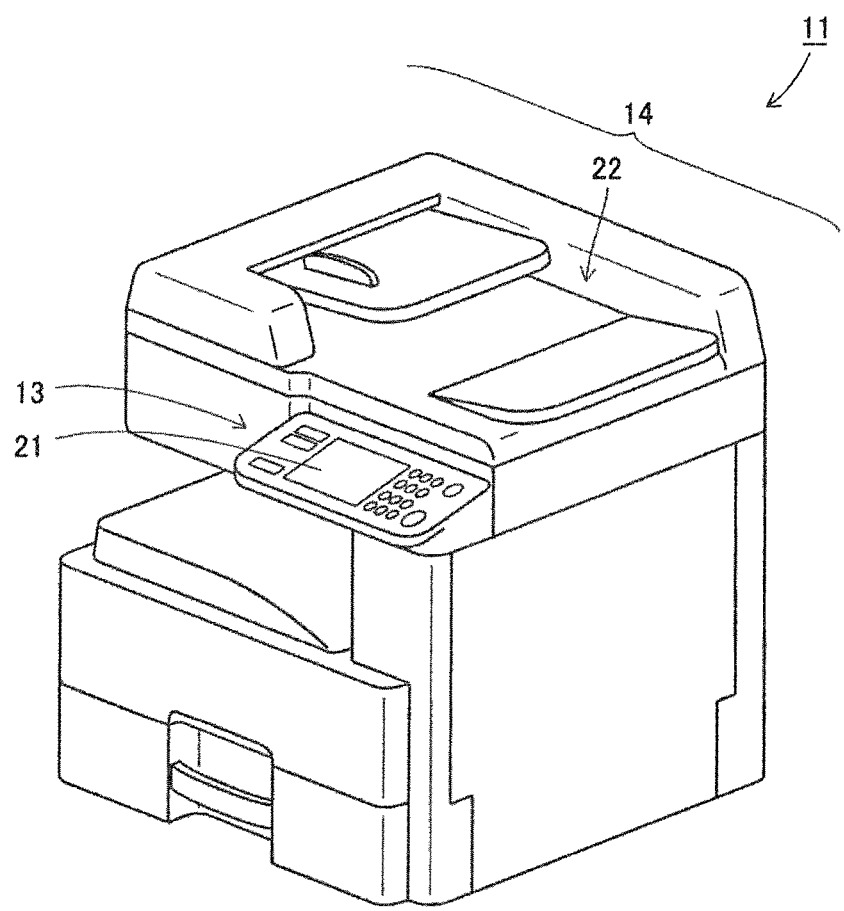
FIG. 1 is a schematic perspective view illustrating the appearance of a multifunction peripheral when an image processing device according to one embodiment of this disclosure is applied to the multifunction peripheral.
Figure 2:
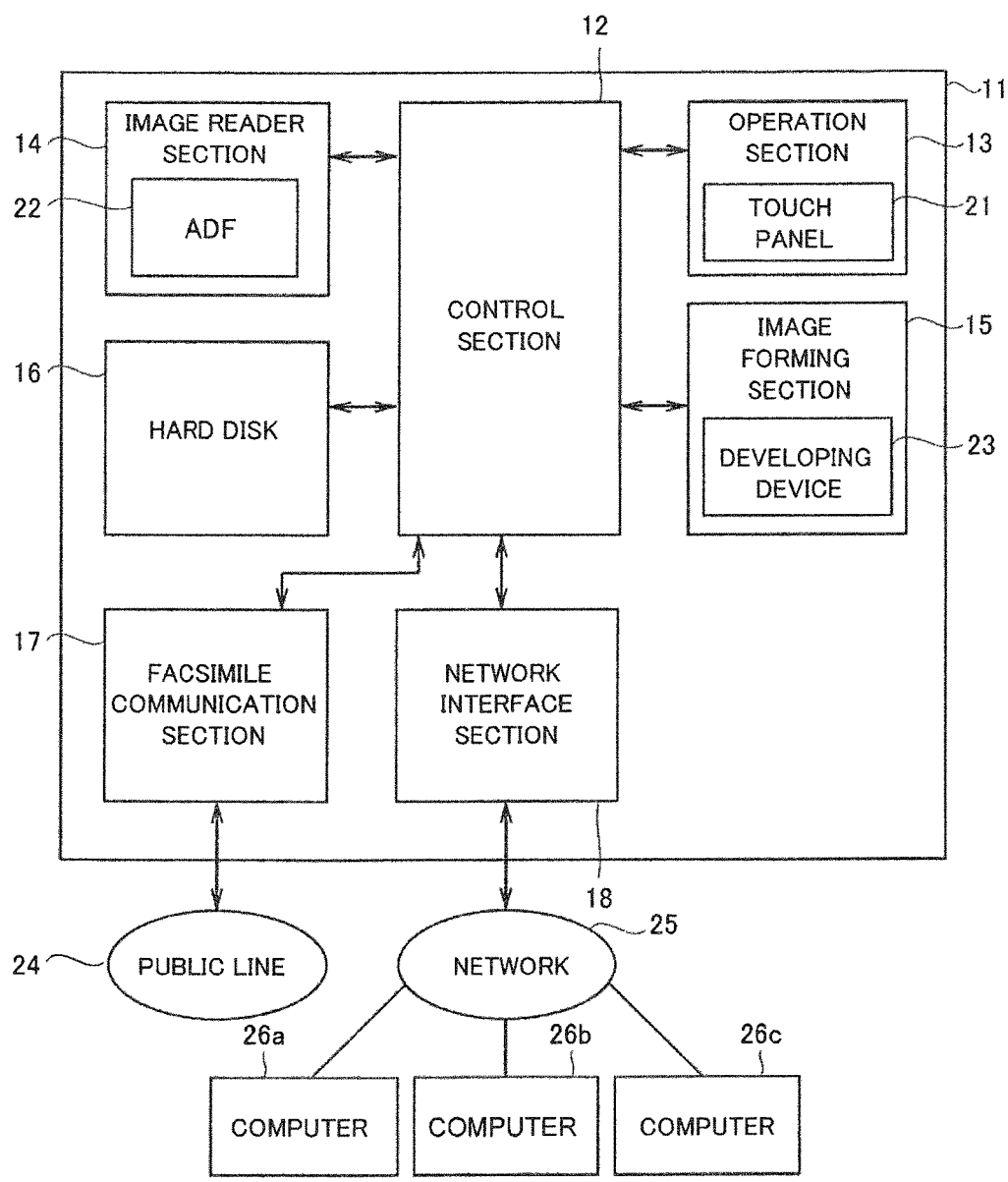
FIG. 2 is a block diagram illustrating a constitution of the multifunction peripheral illustrated in FIG. 1.

Hereinafter, an embodiment of the present disclosure is described. FIG. 1 is a view illustrating the appearance of a multifunction peripheral when an image processing device according to one embodiment of this disclosure is applied to the multifunction peripheral. FIG. 2 is a block diagram illustrating a constitution of the multifunction peripheral illustrated in FIG. 1.

Referring to FIGS. 1 and 2, a multifunction peripheral 11 according to one embodiment of the present disclosure includes a control section 12, an operation section 13 as a display device, an image reader section 14, an image forming section 15 as an image processing section that processes image data, a hard disk 16 as a storage section, a facsimile communication section 17, and a network interface section 18 that establishes a connection with a network 25.

The control section 12 controls the entire multifunction peripheral 11. The operation section 13 includes a touch panel 21 as a display screen displaying information transmitted from the multifunction peripheral 11 side and the contents input by the user. The operation section 13 is configured to enter a condition for image formation such as the required number of print copies or gradation of the image, or to accept a request to switch on and off the power. The condition for image formation and the like may be input through the touch panel 21 by depressing or touching a prescribed area on the touch panel 21. The image reader section 14 includes an ADF (Auto Document Feeder) 22 as a manuscript conveyer that conveys a manuscript from the setting position to the reading position. The image reader section 14 reads an image of a manuscript set on the ADF 22 or a mounting table which is not illustrated in the drawings. The image forming section 15 includes a developing device 23 to form a visible image with a toner. The image forming section 15 forms an image on a conveyed sheet of paper on the basis of an image data read by the image reader section 14 or an image data transmitted through the network 25. The hard disk 16 stores image data transmitted to the multifunction peripheral 11 or input conditions of image formation, and the like. The facsimile communication section 17 is connected to a public line 24, and performs facsimile transmission and facsimile reception.

Although the multifunction peripheral 11 includes a DRAM (Dynamic Random Access Memory) which writes and reads image data and the like, an illustration and a description thereof are omitted. The arrows in FIG. 2 indicate the flow of control signals and data relating to the control or the images.

The multifunction peripheral 11 operates as a copying machine by forming an image on the basis of image data of the manuscript read by the image reader section 14 in the image forming section 15. The multifunction peripheral 11 also operates as a printer by forming an image in the image forming section 15 on the basis of image data transmitted from computers 26a, 26b, and 26c which are connected to the network 25 through the network interface section 18, and printing the image on a sheet of paper. That is, the image forming section 15 operates as a printing section that prints a required image. The multifunction peripheral 11 also operates as a facsimile device by forming an image in the image forming section 15 through the DRAM on the basis of image data transmitted through the public line 24 through the facsimile communication section 17 and by transmitting image data of a manuscript read by the image reader section 14 to the public line 24 through the facsimile communication section 17. Thus, the multifunction peripheral 11 has a plurality of functions relating to image processing such as a copying function, a printer function, and a facsimile function. Furthermore, the multifunction peripheral 11 further has a function which allows detailed settings of each function.

Figure 3:
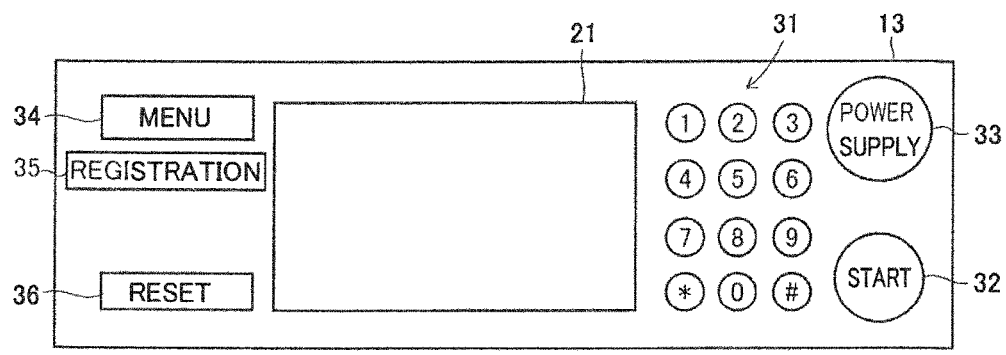
FIG. 3 is an external view illustrating a schematic constitution of the operation section.

Next, a constitution of the operation section 13 mentioned above is described further in detail. FIG. 3 is an external view illustrating a schematic constitution of the operation section 13. Referring to FIG. 3, the operation section 13 includes a numeric keypad 31 for inputting the numbers of 0-9 to designate the number of printing copies or the like and a sign of "*" and "#", a start key 32 for starting printing or facsimile transmission, a power key 33 for turning on or off the power of the multifunction peripheral 11, a menu key 34 for selecting of the function of the multifunction peripheral 11 such as the printer function or copying function, a registration key 35 for registering various conditions of image formation or information of a user, a reset key 36 for canceling the contents of instruction input by a user through the numeric keypad 31, and the touch panel 21.

Figure 4:
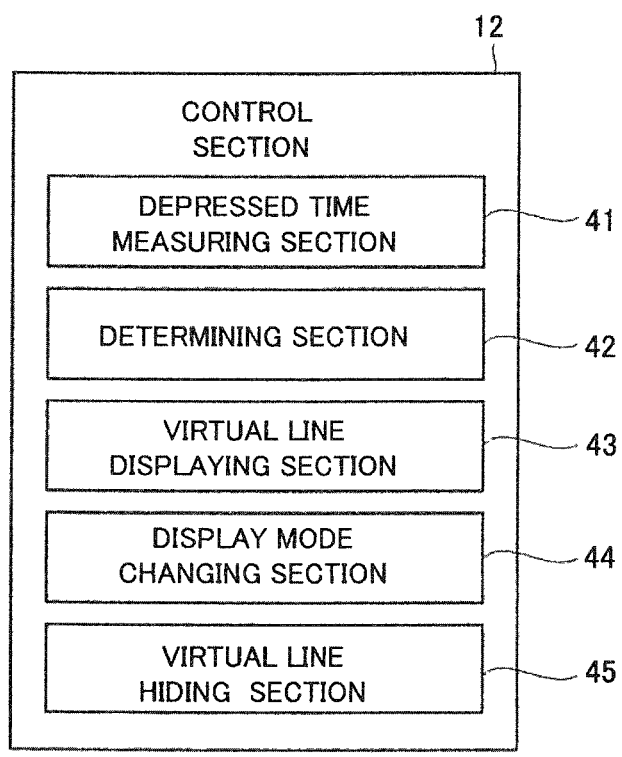
FIG. 4 is a block diagram illustrating a constitution of the control section.

Then, a constitution of the control section 12 is described further in detail. FIG. 4 is a block diagram illustrating a constitution of the control section 12. Referring to FIG. 4, the control section 12 includes a depressed time measuring section 41, a determining section 42, a virtual line displaying section 43, a display mode changing section 44, and a virtual line hiding section 45. The depressed time measuring section 41 measures depressed time on the touch panel 21. The determining section 42 is determined whether the depressed time measured by the depressed time measuring section 41 is longer than prescribed period of time. The virtual line displaying section 43 displays a virtual line extending in the diagonal direction of the rectangular image if the determining section 42 determines that the depressed time is longer than the prescribed period of time. The display mode changing section 44 changes display modes of the image that has been displayed on the touch panel 21 depending on the depressed state of the virtual line displayed by the virtual line displaying section 43. The virtual line hiding section 45 hides the displayed virtual line when the depression in an area not on the virtual line is detected. These will be described below.

Figure 5:
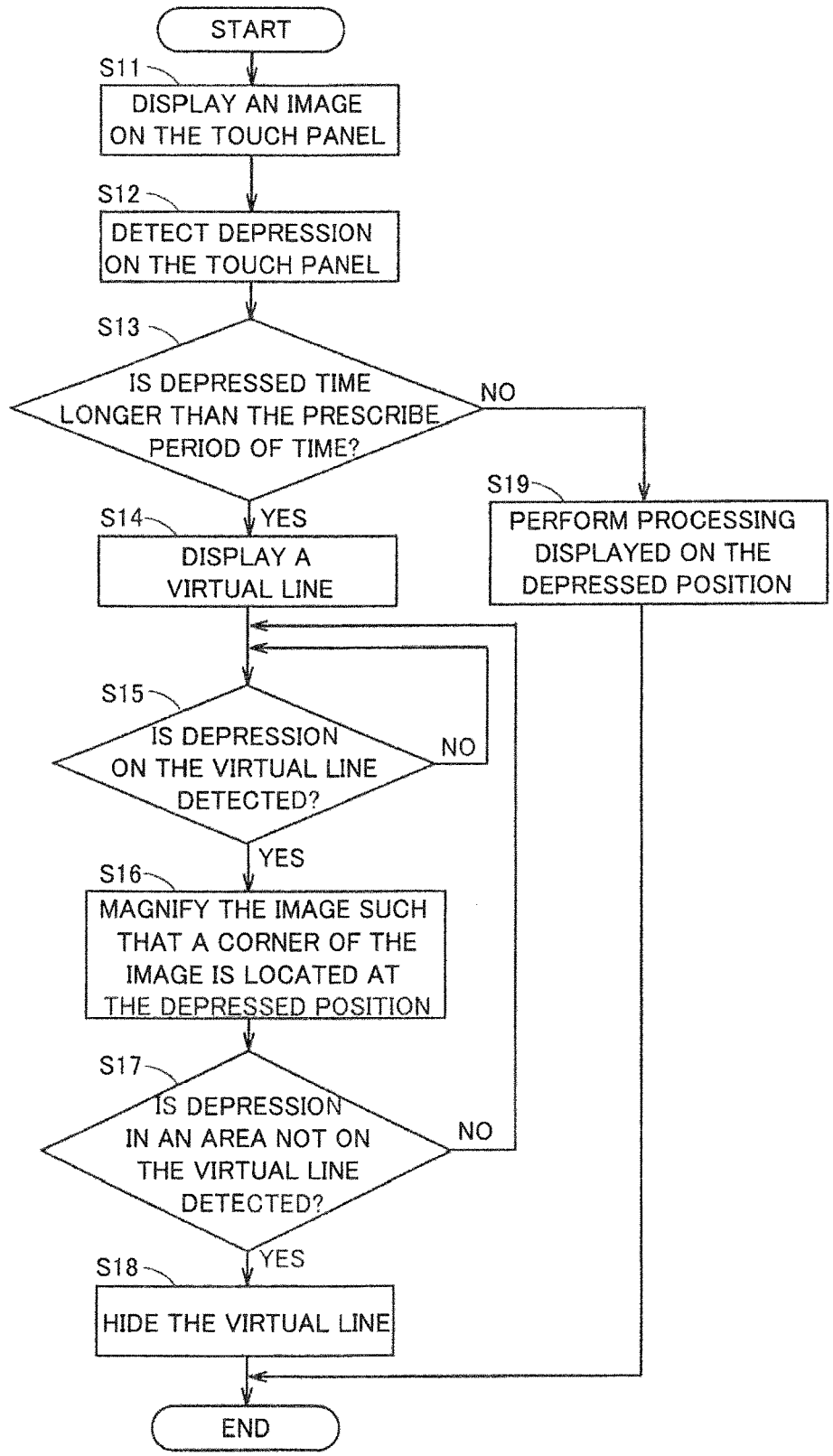
FIG. 5 is a flow chart illustrating a flow of processing when the size of an image displayed on the touch panel is changed.

Then, a process of modifying the size of an image displayed on the touch panel 21 in the multifunction peripheral 11 according to one embodiment of this disclosure is described. FIG. 5 is a flow chart illustrating a flow of processing when the size of an image displayed on the touch panel is changed in the multifunction peripheral 11 according to one embodiment of this disclosure.

Referring to FIG. 5, on the touch panel 21, which is the display screen of the operation section 13, an image based on the image data read by the image reader section 14 using the ADF 22 is displayed. Now, a process to display a magnified image in response to the request by a user is described.

Figure 6:
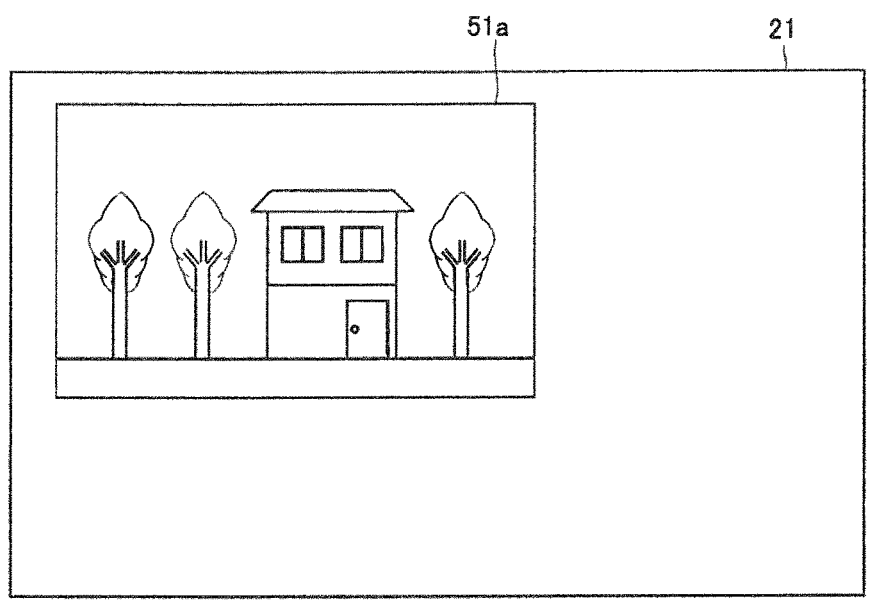
FIG. 6 is a view illustrating an example of a display on the touch panel.

The control section 12 displays an image 51a based on the image data read by the image reader section 14 on the touch panel 21 (The step S11 in FIG. 5, where "the step" is omitted hereafter). FIG. 6 is a view illustrating an example of a display on the touch panel 21 in this case. Referring to FIG. 6, the image 51a is, for example, an image 51a including a plurality of trees and a house. The image 51a has a horizontally long rectangular shape. The image 51a is displayed relatively small such that the image 51a should be located at a slightly left upper position in relation to the entire area of the touch panel 21.

Here, a user makes long depression on the touch panel 21 to magnify the size of image 51a. Specifically, the user depresses an arbitrary point in the area of the image 51a displayed on the touch panel 21, for example. The control section 12 detects the depression on the touch panel 21 by the user (S12).

Then, the depressed time measuring section 41 measures the depressed time on the touch panel 21. In this case, the depressed time is measured using a timer (not shown) that is provided in the control section 12.

Then, if the determining section 42 determines that the measured depressed time is longer than the prescribed period of time (YES in S13), the virtual line displaying section 43 displays a virtual line 53a (S14). Here, the prescribed period of time is set in advance, for example, by a manager of the multifunction peripheral 11. The prescribed period of time is set such that the period of time should be somewhat longer than a depressed time required for a normal operation, such as an operation to input the conditions for image formation. Specifically, the prescribed period of time is an arbitrary value between five seconds and ten seconds, for example.

Figure 7:
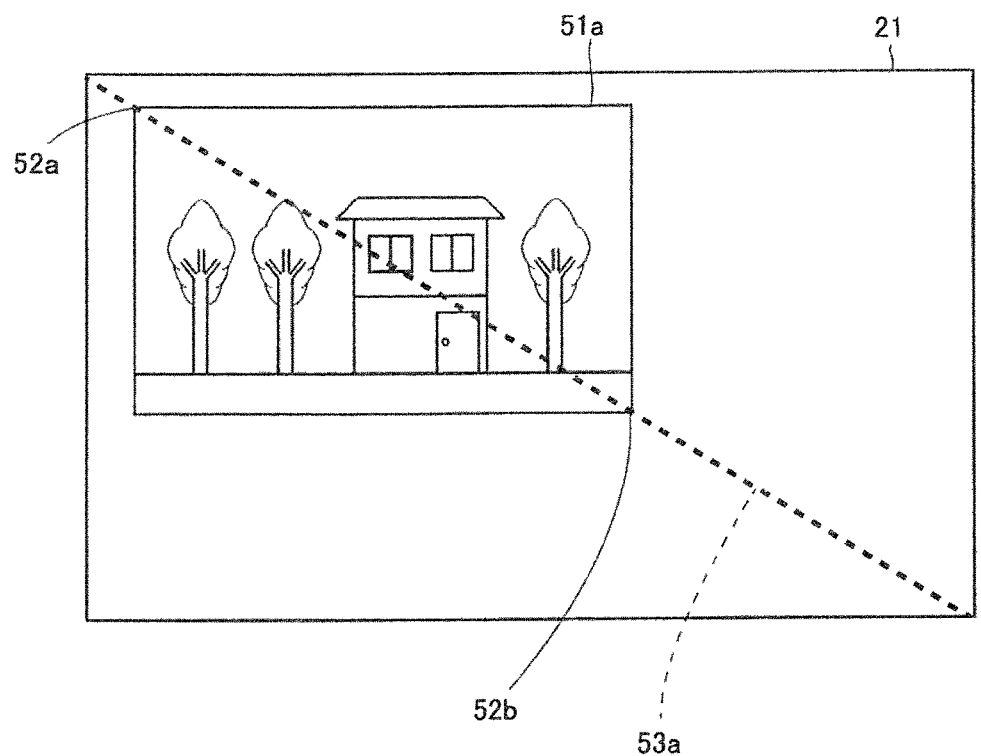
FIG. 7 is a view illustrating an example of a display on the touch panel.

FIG. 7 is a view illustrating an example of a display on the touch panel 21 in this case. Referring to FIG. 7, the virtual line displaying section 43 displays a virtual line 53a extending in the direction of the diagonal line from the upper left corner 52a towards the lower right corner 52b of the rectangular image 51a displayed on the touch panel 21. The virtual line 53a is illustrated in a broken line. The virtual line 53a is displayed such that its length should become longer than the length of the diagonal line. In this case, the virtual line 53a is displayed such that it should extend from the upper left corner to the lower right corner of the touch panel 21.

Figure 8:
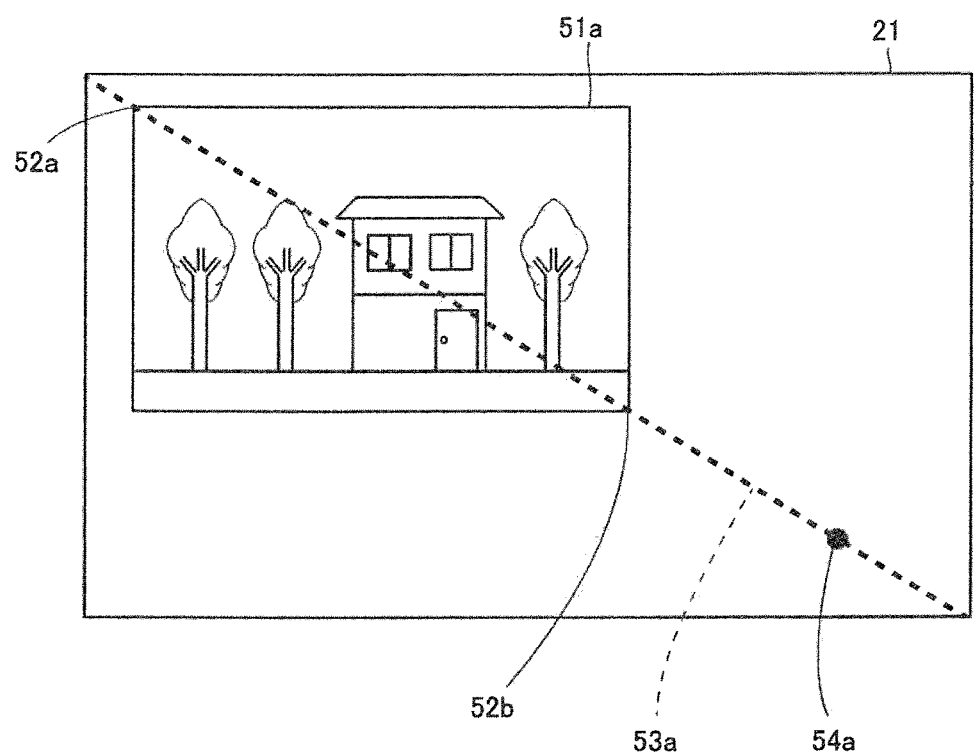
FIG. 8 is a view illustrating an example of a display on the touch panel.

Then, for example, the user depresses a certain position 54a on the virtual line 53a with a finger of the user to extend the size of the image 51a. FIG. 8 is a figure illustrating an example of a display of the touch panel 21 in this case. Referring to FIG. 8, the position 54a depressed by the user is a position 54a on the virtual line 53a in an area out of the displayed area of the image 51a. Then, the display mode changing section 44 detects the depression on the position 54a on the virtual line 53a (YES in S15).

If the display mode changing section 44 detects the depression on the position 54a on virtual line 53a, the display modes of the image 51a are changed. In this case, the display mode changing section 44 magnifies the display size of the image 51a such that a corner of the image 51a, specifically the lower right corner 52b, is located at the depressed position 54a on the virtual line 53a (S16).

Figure 9:
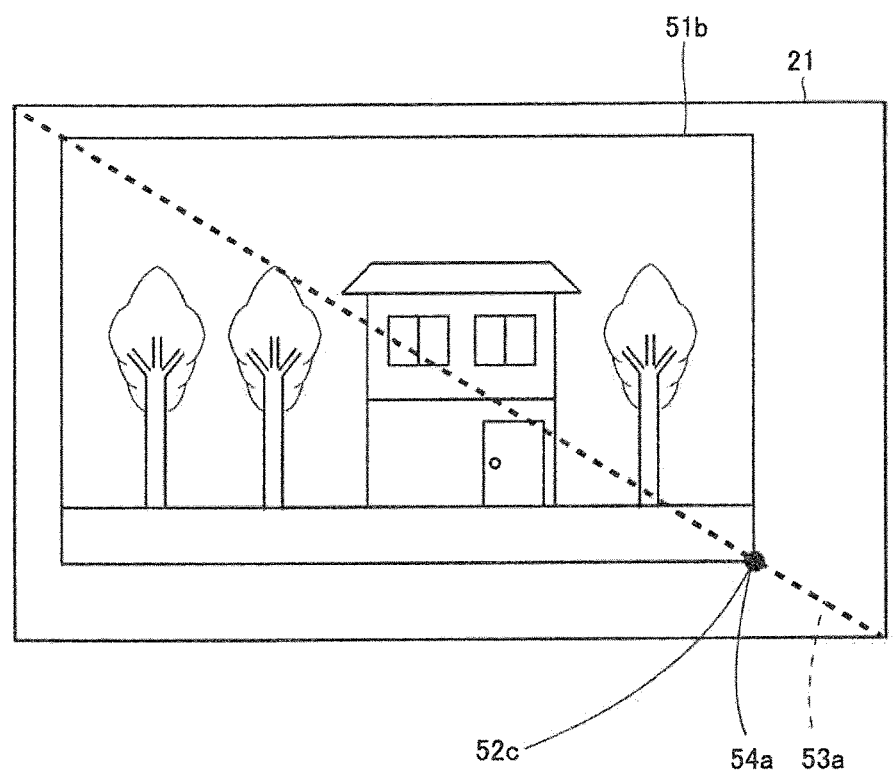
FIG. 9 is a view illustrating an example of a display on the touch panel.

FIG. 9 is a view illustrating an example of the display on the touch panel 21 in this case. Referring to FIG. 9, a magnified image 51b is displayed on the touch panel 21. On this image 51b, a magnification factor is calculated by the display mode changing section 44 such that the lower right corner 52c should be located at the position 54a where the depression is detected. Thus, the image 51a is magnified at a calculated magnification factor.

A user requests the magnified image 51b to be displayed in this way. Then, the magnification factor is finely adjusted according to need. That is, the user depresses an arbitrary point on the virtual line 53a, to magnify the image 51b at the magnification factor that the user requires. In this case, when a position on the virtual line 53a in the displayed area of the image 51b is depressed, the size of image 51b is reduced.

Figure 10:
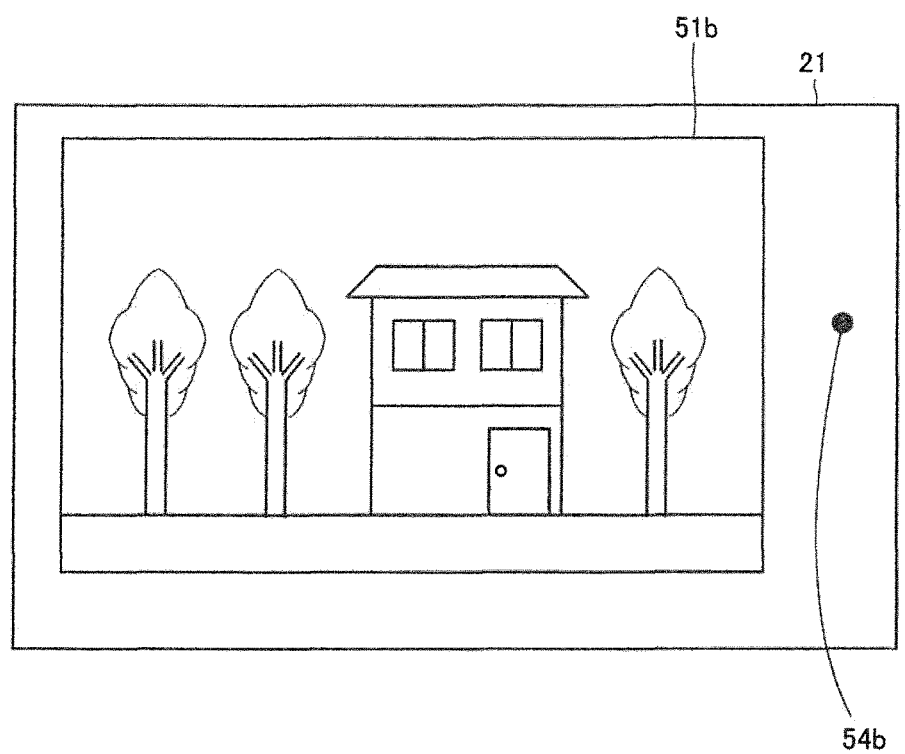
FIG. 10 is a view illustrating an example of a display on the touch panel.

When the image 51b magnified at the magnification factor that the user requires is displayed, the user depresses an area not on the virtual line 53a to hide the virtual line 53a. FIG. 10 is a view illustrating an example of a display on the touch panel 21 in this case. Referring to FIG. 10, the user depresses a point of the position 54b which is an area not on the virtual line 53a. If the depression in an area not on the virtual line 53a is detected (YES in S17), the virtual line hiding section 45 hides the virtual line 53a (S18). Processing is finished in this way. Meanwhile, if the determining section 42 determines that the depressed time is shorter than the prescribed period of time in S13 (NO in S13), the processing in accordance with the contents such as icons displayed at the depressed position and the like is performed (S19).

According to the multifunction peripheral 11 having such a constitution, the virtual line 53a is displayed in relation to the image 51a, the display modes are changed in response to the operation performed on this virtual line 53a. Then, for example, on magnification or reduction of the image 51a, the image 51a can be displayed at a desired size without frequent depression of operation keys and the like. Thus, such a multifunction peripheral 11 can change the display modes of the image 51a more easily.

In the above embodiment, the image 51a is magnified or reduced as change of the display modes of the image 51a. However, it is not limited to this embodiment. For example, the display modes may be changed by rotating the image 51b.

Figure 11:
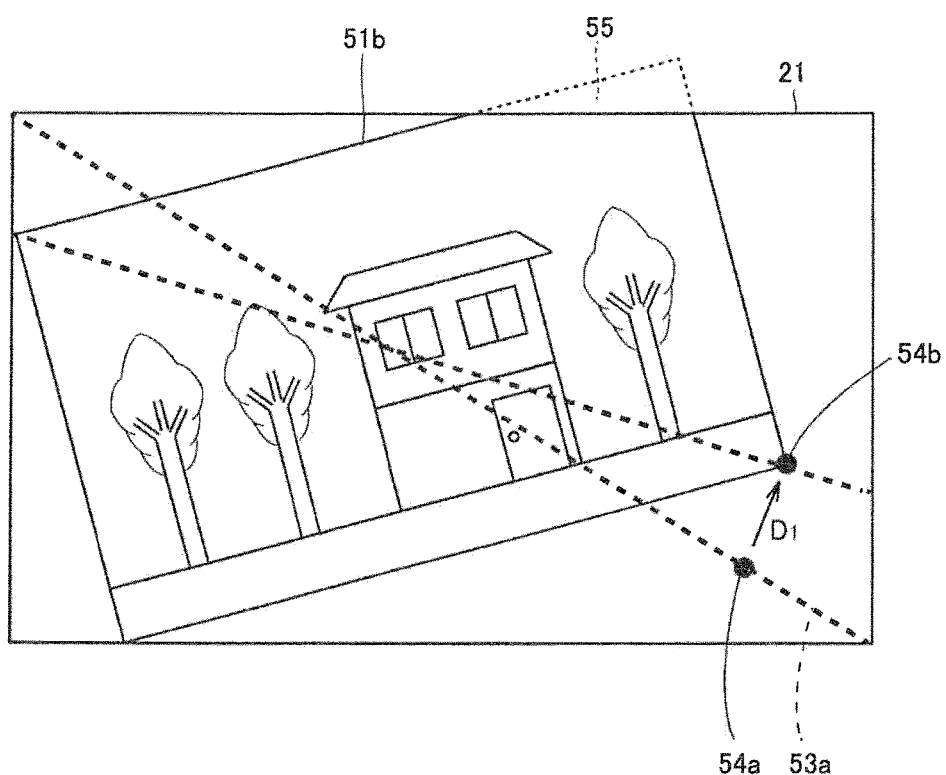
FIG. 11 is a view illustrating an example of a display on the touch panel.

FIG. 11 is a view illustrating an example of a display on the touch panel 21 in this case. Referring to FIG. 11, in the image 51b, it is assumed that a user depresses the position 54a, and slides his or her finger in the direction shown as the arrow D1 from the depressed position 54a to the position 54b. Then, the display mode changing section 44 displays the image 51b such that the image 51b is rotated in the slid direction from the depressed position 54a on the virtual line 53a. The center of rotation in this case is the center of the image 51b.

Thus, not only magnification or reduction of the image 51b but also rotation thereof can be performed easily. Further, in addition to magnification and reduction, rotation of the image 51b is performed, to thereby display a more accurate image along the request of a user.

On the part 55 which is illustrated as a broken line in FIG. 11 and which is out of the displayed area on the touch panel by rotation, the corresponding part of the image 51b may be hidden. That is, the display mode changing section 44 changes display modes not to display the image 51b in the part 55 which is out of the touch panel 21. Thus, the image 51b can be displayed more effectively.

In the above embodiment, the display mode changing section 44 may be configured to display the image to interchange the directions of the longitudinal and lateral sides of the image 51b when the angle of rotation becomes 45 degrees or more. The visibility of a user can be more highly improved in this way.

Also, in the above embodiment, the virtual line displaying section 43 may display the virtual line 53a in the rectangular image 51b to extend from the upper right corner towards the left lower corner. Of course, two virtual lines 53a each extending in the two diagonal directions may be displayed as the virtual lines 53a.

In the above embodiment, the virtual line hiding section 45 hides the virtual line 53a if the depression in an area not on the virtual line 53a is detected. However, the embodiment is not limited to this. For example, the virtual line 53a may be hidden if the depression on the touch panel 21 is not detected for a time over a prescribed period of time.

In the above embodiment, the virtual line 53a is a broken line. However, the form of the virtual line 53a is not limited to the broken line. Thus, the virtual line 53a may be another form of a line, such as a dash line, a two-dot chain line, a flickering line, a colored line with a color that is not included in the displayed image, or a line part of which is a dotted line or a dash line.

In the above embodiment, the operation section 13 is controlled by the control section 12. However, the embodiment is not limited to this. For example, the operation section 13 may be controlled by the operation section 13 as the display device. That is, the operation section 13 may be constituted to include a display control section that controls a display and to change the display modes on the basis of the virtual line by this display control section.

The embodiments described above are to be considered in all aspects as illustrative only and not restrictive in any manner. The scope of this disclosure is defined not by the explanation described above, but by claims. All modifications which come within the meaning and range of equivalency of the claims are to be embraced within the scope of the present disclosure.

The display device and image processing device according to the present disclosure are used particularly effectively when the improvement of the operability is required.

What is claimed is:

1. A display device that displays an image based on image data, comprising:
   a touch panel that transforms image data into a rectangular image and displays the rectangular image on a screen,
   a depressed time measuring section that measures depressed time in an area of the rectangular image displayed on the touch panel by detecting depression on the touch panel and measuring the time during depression using a timer,
   a determining section that determines whether the depressed time measured by the depressed time measuring section is longer than a prescribed period of time,
   a virtual line displaying section that displays a virtual line extending in a diagonal direction of the rectangular image the depressed time measured by the depressed time measuring section of which is determined to be longer than the prescribed period of time by the determining section such that the length of the virtual line should become longer than the length of the diagonal line if the determining section determines that the depressed time is longer than the prescribed period of time, a display mode changing section that changes display modes of the image that has been displayed on the touch panel depending on a depressed state of a virtual line displayed by the virtual line displaying section, and a virtual line hiding section that hides the virtual line displayed by the virtual line displaying section, wherein the display mode changing section waits until the display mode changing section detects a depression on the virtual line, and if the display mode changing section detects the depression on the virtual line, the display mode changing section magnifies or reduces the display size of the image such that a corner of the image is located at the depressed position on the virtual line, the virtual line hiding section hides the virtual line if the depression in an area not on the virtual line is detected, and the display mode changing section magnifies the display size of the image such that the corner of the image is located at the depressed position on the virtual line if the display mode changing section detects a depression area out of the displayed area of the rectangular image, and reduces the display size of the image such that the corner of the image is located at the depressed position on the virtual line if the display mode changing section detects a depression area inside of the displayed area of the rectangular image.

2. The display device according to claim 1, wherein
the display mode changing section displays the image such that the image is rotated in a slid direction from a depressed position on the virtual line.

3. The display device according to claim 2, wherein
the display mode changing section displays the image to interchange the directions of longitudinal and lateral sides of the image when an angle of rotation becomes 45 degrees or more.

4. The display device according to claim 1, wherein
the display mode changing section changes the image to hide the image of the part out of the displayed area on the touch panel.

5. The display device according to claim 1, wherein
the virtual line displaying section displays a virtual line extending in a direction along an diagonal line from an upper left corner towards a lower right corner of the rectangular image.

6. The display device according to claim 1, wherein
the virtual line includes a broken line.

7. An image processing device, comprising
an image processing section that processes an image based on image data, and
the display device according to claim 1.

* * * * *